(12) United States Patent
Salter et al.

(10) Patent No.: US 11,485,668 B2
(45) Date of Patent: Nov. 1, 2022

(54) GLASS FORM AND MARKING

(71) Applicant: Ford Global Technologies, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US); Daniel J. Martin, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 16/537,037

(22) Filed: Aug. 9, 2019

(65) Prior Publication Data

US 2021/0039977 A1 Feb. 11, 2021

(51) Int. Cl.
| C03B 19/00 | (2006.01) |
| C03B 1/00 | (2006.01) |
| C03B 25/08 | (2006.01) |
| C03B 18/02 | (2006.01) |
| C03B 23/035 | (2006.01) |
| C03C 23/00 | (2006.01) |
| C03B 35/16 | (2006.01) |

(52) U.S. Cl.
CPC ............... *C03B 19/00* (2013.01); *C03B 1/00* (2013.01); *C03B 18/02* (2013.01); *C03B 23/0355* (2013.01); *C03B 25/08* (2013.01); *C03B 35/16* (2013.01); *C03C 23/00* (2013.01)

(58) Field of Classification Search
CPC .................................................. C03B 23/0255
See application file for complete search history.

(56) References Cited

U.S. PATENT DOCUMENTS

| 3,484,225 | A | * | 12/1969 | Bognar | C03B 23/0352 65/103 |
| 3,529,947 | A | * | 9/1970 | Frank | C03B 23/031 65/104 |
| 3,687,648 | A | * | 8/1972 | Oulton | C03B 27/052 65/351 |
| 4,204,854 | A | * | 5/1980 | McMaster | C03B 23/0252 65/104 |
| 4,386,952 | A | * | 6/1983 | Nitschke | C03B 23/0258 65/273 |
| 4,682,997 | A | * | 7/1987 | Halberschmidt | C03B 23/035 65/104 |
| 4,865,638 | A | * | 9/1989 | Kudo | C03B 23/035 65/273 |
| 5,009,695 | A | * | 4/1991 | Kuster | C03B 23/03 65/182.2 |
| 5,078,770 | A | | 1/1992 | Lehto et al. | |

(Continued)

FOREIGN PATENT DOCUMENTS

GB 2028192 A * 3/1980 ........... B24C 7/0046

*Primary Examiner* — Erin Snelting
(74) *Attorney, Agent, or Firm* — Burris Law, PLLC

(57) ABSTRACT

Processes and methods for preparing glass panels for use with automobiles include mixing and melting glass particles. Molten glass is passed along into a lehr, where the molten glass is annealed. Annealed glass is cut into glass panels. A nozzle systems delivers compressed air to the glass panels to form a curvature for providing a top seal contact area. A nozzle system delivers a second blast of compressed air, which marks the glass panel to identify characteristics of the glass panel.

14 Claims, 7 Drawing Sheets

(56) References Cited

U.S. PATENT DOCUMENTS

| | | | |
|---|---|---|---|
| 5,147,439 A * | 9/1992 | Ritz | C03B 23/035 |
| | | | 65/273 |
| 5,893,941 A * | 4/1999 | Nikander | C03B 27/0442 |
| | | | 65/104 |
| 6,079,227 A | 6/2000 | Yoshizawa et al. | |
| 6,132,818 A * | 10/2000 | Tanaka | B41M 5/38207 |
| | | | 427/596 |
| 6,725,689 B2 | 4/2004 | Honjo et al. | |
| 8,109,117 B2 | 2/2012 | Balduin et al. | |
| 8,256,244 B2 | 9/2012 | Imaichi et al. | |
| 9,573,833 B2 | 2/2017 | Brennan et al. | |
| 2004/0058167 A1* | 3/2004 | Arbab | C03C 17/006 |
| | | | 428/426 |
| 2004/0107729 A1* | 6/2004 | Fukami | C03B 29/08 |
| | | | 65/25.4 |
| 2013/0152635 A1 | 6/2013 | Tovar | |
| 2014/0353381 A1* | 12/2014 | Stuck | G06K 7/1417 |
| | | | 235/462.11 |
| 2015/0299025 A1 | 10/2015 | Brown et al. | |
| 2016/0280594 A1* | 9/2016 | Muehlke | C03B 32/02 |
| 2017/0121209 A1 | 5/2017 | Dannoux et al. | |
| 2017/0327402 A1 | 11/2017 | Fujii et al. | |
| 2018/0282207 A1* | 10/2018 | Fujii | C03B 40/00 |
| 2019/0308900 A1* | 10/2019 | Vogl | B32B 17/10036 |
| 2019/0389767 A1* | 12/2019 | Ozan | C03B 25/04 |

* cited by examiner

GLASS FORM AND MARKING

FIELD

The present disclosure relates to glass panels, for example as used in automotive driver and passenger side windows, and more particularly to an improved glass form and markings for such glass panels.

BACKGROUND

The statements in this section merely provide background information related to the present disclosure and may not constitute prior art.

Referring to FIG. 1, by way of example, modern automotive driver and passenger side windows (e.g., window 10) generally follow an inboard curved path to detent secondary sealing members (e.g., secondary sealing members 12) to contact a primary seal (e.g., primary seal 14) to ensure water does not enter the cabin of the automobile. In many applications, ensuring water does not enter the cabin of the automobile is accomplished by providing a small radius formed into the top of the glass panel to securely engage with the primary seal. Under many applications, the radius may be as small as less than or equal to about 2 millimeters to greater than or equal to about 1 millimeter. The radius provides smooth operation of the window when proceeding from an open to closed position as well as ensures water does not run off into the cabin of the automobile or into the sealing member.

Under conventional processes, the top glass bend radius is formed late in the glass making process. More specifically, a thin layer of molten glass is passed along a glass panel forming system into a lehr, where the molten glass is annealed. After annealing, the glass is cut to shape to form a glass panel. The glass panel is then heated to, or kept at, a temperature sufficient that the glass panel is capable of bending as desired without breaking or otherwise sacrificing ductility, strength, and/or other desired properties, and the glass panel engages with a heated metal press or an air press, which gently bends the glass panel into the shape and contour desired.

Such conventional processes are very slow and costly. For example, when metal presses are used, metal dies of a glass panel forming system may need to be changed depending on the resultant glass panel desired. Further, on occasion, the small radius into the top of the glass panel to form the seal may mistakenly be missing, or the glass panels may be mislabeled, which may not be discovered until a fully assembled vehicle undergoes final inspection.

These issues with forming glass panels that seal properly, among other issues with forming glass panels, are addressed by the present disclosure.

SUMMARY

According to one form of the present disclosure, a method of forming a curved portion of a glass panel is disclosed. This method includes applying sequential bursts of compressed air at a first pressure to the curved portion as the glass panel is being conveyed through a lehr and subsequently applying compressed air at a second pressure that is higher than the first pressure to form identification markings in the glass panel.

According to a variation, the method further includes, prior to applying sequential bursts of compressed air, the following steps: mixing raw materials comprising glass particles, melting the mixed raw materials to form molten glass, floating the molten glass over a float chamber, annealing the molten glass in a lehr, and cutting the annealed glass into a glass panel.

According to another variation, compressed air is applied at the second pressure to mark a dot matrix onto the glass panel. According to yet other such variations, the dot matrix comprises readable binary code.

In yet another variation, applying compressed air at a first pressure is accomplished with a first nozzle system and applying compressed air at a second pressure is accomplished with a second nozzle system.

In a further variation, greater than or equal to about 750 glass panels are formed per hour.

According to another form, a method of forming a curved portion of a glass panel is disclosed. The method includes applying sequential bursts of compressed air at a first pressure to the curved portion as the glass panel is being conveyed through a lehr, followed by arranging the curved portion of the glass panel with at least a nozzle directing compressed air at a second pressure that is higher than the first pressure to the glass panel, and then applying compressed air at the second pressure to form identification markings in the glass panel.

In a variation, applying compressed air at a second pressure marks a dot matrix onto the glass panel. In other such variations, the dot matrix comprises an eight-combination marking system. In yet other such variations, the dot matrix comprises readable binary code.

In another variation, applying compressed air at a first pressure is accomplished with a first nozzle system and applying compressed air at a second pressure is accomplished with a second nozzle system.

In a further variation, greater than or equal to about 750 glass panels are formed per hour.

In yet a further variation, prior to applying sequential bursts of compressed air, the following steps are included: mixing raw materials comprising glass particles, melting the mixed raw materials to form molten glass, floating the molten glass over a float chamber, annealing the molten glass in the lehr, and cutting the annealed glass into the glass panel.

According to yet another form, a system for forming a glass panel is disclosed. The system includes a mixing apparatus for weighing and mixing glass and additives, an oven for melting and holding molten glass, a float chamber for floating molten glass thereover, an annealing lehr, and at least a nozzle for delivering compressed air at at least one of a first pressure and a second pressure.

In a variation, the at least a nozzle for delivering compressed air at a second pressure marks a dot matrix onto the glass panel. In other such variations, the dot matrix comprises an eight-combination marking system. In yet other such variations, the dot system matrix comprises readable binary code.

In another variation, the at least a nozzle for delivering compressed air comprises a first nozzle system for delivering air at a first pressure and a second nozzle system delivers air at a second pressure.

In a further variation, the at least a nozzle for delivering compressed air delivers compressed air at a first pressure and a second pressure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
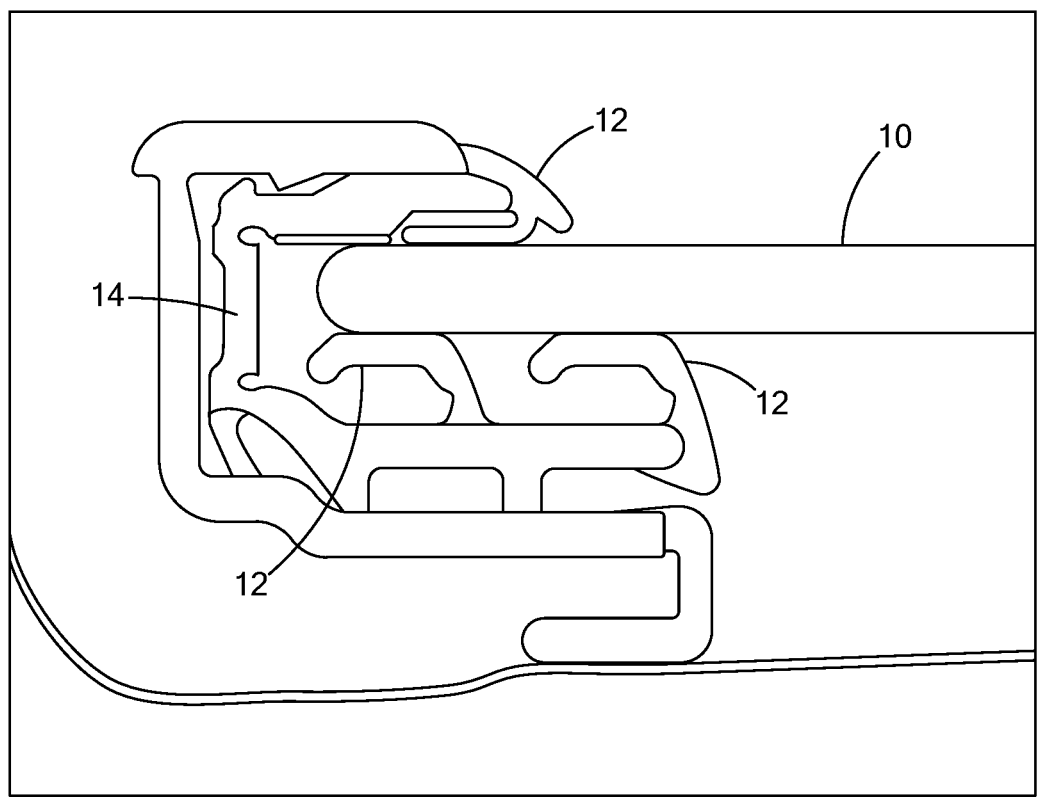
FIG. 1 is a schematic view of a glass panel forming a seal with a sealing member according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Systems and methods for forming a glass panel are disclosed. The systems and methods exhibit several advantages over conventional systems and processes, including providing cost savings, better reliability that the glass panel is properly formed and labeled, and increased production speeds.

Figure 2:
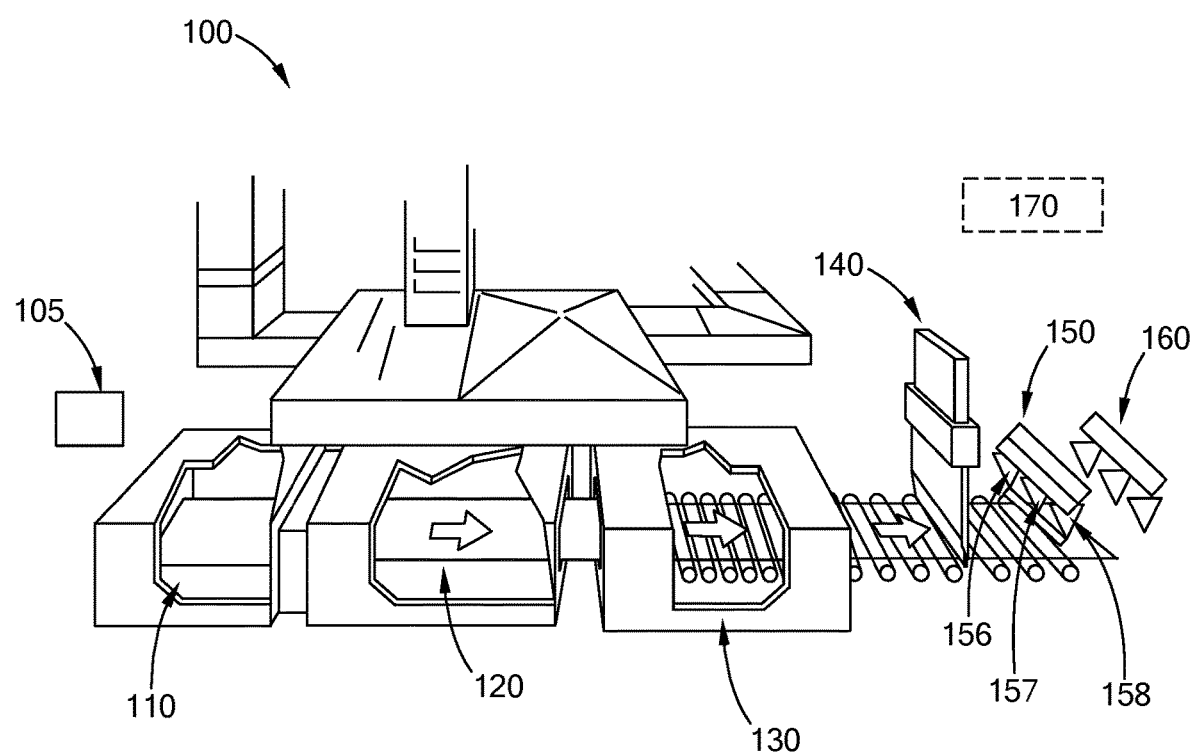
FIG. 2 is a diagrammatic view of a glass panel forming system according to the present disclosure.

Referring to FIG. 2, a glass panel forming system 100 includes a mixing apparatus 105 (shown schematically) for weighing and mixing glass particles and, optionally, additives. The composition of glass particles and any optional additives can be predetermined depending on the properties desired in a resultant glass panel.

After sufficient mixing, the glass mixture is introduced into oven 110. The oven 110 is heated to a temperature sufficient to melt the glass mixture into molten glass and may be in the shape of a tank having a stirrer to ensure the glass mixture remains homogenous.

A portion of the molten glass travels from the oven 110 to form a thin layer of molten glass over float chamber 120. The float chamber 120 may comprise molten tin, continuous air blowers, or ceramic rollers, or other devices that function to create a desirable thin glass profile. By way of example, when the float chamber 120 comprises a molten tin bath, the thin layer of molten glass floats over the molten tin bath. The thickness of the molten glass can depend on the characteristics desired in the formed glass panel.

The thin layer of molten glass floats over the float chamber 120 and the temperature of the thin layer of molten glass decreases as its distance relative to the oven 110 increases. Thus, as the thin layer of molten glass exits the float chamber 120, the thin layer of molten glass may be in a semi-hard yet moldable state. The thin layer of molten glass proceeds into lehr 130, where the glass is annealed as desired.

The annealed glass continues to travel through the lehr 130 towards cutters 140, where annealed glass is cut into glass panels having a desired length and width. The glass panels are kept at a temperature sufficient to maintain their moldability. The glass panels are then transferred along rollers, air blowers, or the like.

Figure 3A:
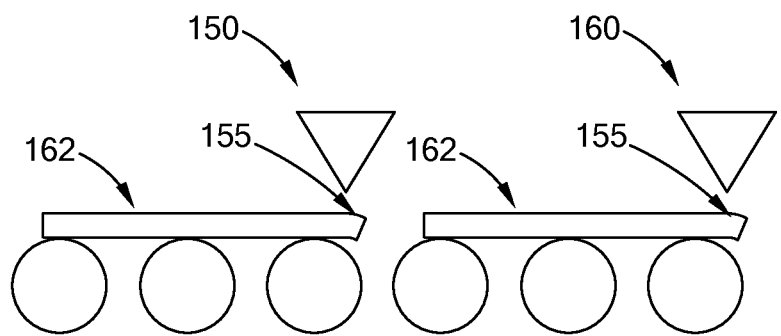
FIG. 3A is an enlarged schematic front view of the nozzle systems shown in FIG. 2.

After annealing and cutting, the temperature of the glass panel is maintained at or heated to a temperature such that the glass panel is moldable, and the glass panel 162 and a first nozzle system 150 are located relative with one another such that compressed air directed from the first nozzle system 150 bends a top bend radius 155 into the glass panel 162, as shown in FIG. 3A. By way of example, compressed air is directed from the first nozzle system 150 for greater than or equal to about 5 milliseconds to less than or equal to about 7 milliseconds, which forms on a top edge of the glass panel 162 a curvature radius of greater than or equal to about 1.5 millimeters to less than or equal to about 3 millimeters. In a variation, water jets or other media that are capable of deforming glass panels without sacrificing the resultant glass properties could also be used rather than compressed air. The pounds per square inch (PSI) from each nozzle of the first nozzle system 150 can be calculated such that a precise and equal bend is achieved with every glass panel. The number of nozzles of the first nozzle system 150 can depend upon the size of the glass panel, the properties of the glass panel, the radius of the glass panel desired, and the like. According to a variation, the first nozzle system 150 comprises at least three nozzles 156, 157, and 158, for delivering localized precise compressed air.

After the top bend radius 155 is formed on the glass panel 162, second nozzle system 160 and the glass panel 162 are located relative with one another such that compressed air directed from the second nozzle system 160 forms at least an indentation on the glass panel 162 at a desired location, such as near the curvature developed by the first nozzle system 150. Compressed air directed from the second nozzle system 160 is directed at a pressure higher than compressed air blasted from the first nozzle system 150, forming an indentation pattern 165. The indentation pattern 165 formed by compressed air directed from the second nozzle system 160 mark the glass panel 162, and those markings can be used to identify characteristics of the glass panel 162, such as whether the glass panel 162 was tempered, the tint level of the glass panel 162, whether the glass panel 162 was laminated, the amount of radius of the top bend radius 155 formed by the first nozzle system 150, for which application the glass panel 162 was designed for, and the like.

Figure 3B:
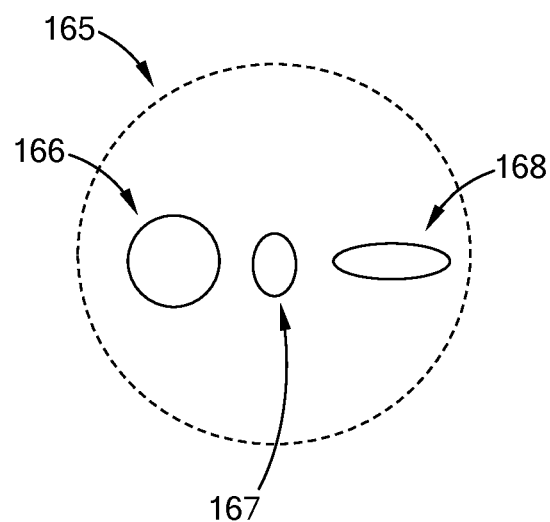
FIG. 3B is an enlarged schematic front view of the identification pattern shown in FIG. 3A.

According to a variation, the second nozzle system 160 forms a plurality of indentations that can be used to identify characteristics of the glass. Referring to FIG. 3B, according to a variation, a first indentation 166 may be sized differently than subsequent indentations (e.g., second indentation 167) following the first indentation 166 to identify a start location, and a final indentation 168 may be sized differently than indentations preceding the final indentation 168 to identify an end location. In this manner, the indentation pattern 165 can form identification markings, such as a binary code pattern, where a dot present between the start location and end location can represent a 1 and an absence of a dot between the start location and end location can represent a 0. With such a pattern, a binary code pattern of three possible indentations (e.g., the first indentation 166, the second indentation 167, and the final indentation 168) placed between a start location and an end location can provide an 8-combination marking system, where each combination represents a marking for identifying the characteristics of the glass panel. According to yet another variation, the start location could be one of the three possible indentations. According to yet another variation, the end location could be one of the three possible indentations. According to yet another variations, the start location could be one of the three possible indentations, and the end location could be one of the other three possible indentations. Rounded indentations should be used to avoid creating stress points in the glass panels. The pounds per square inch (PSI) from each nozzle of the second nozzle system 160 can be calculated such that a predetermined, desirable indentation pattern is achieved with every glass panel. By way of not limiting example, the PSI may be less than or equal to about 5 PSI, and in some aspects, less than or equal to about 2 PSI. The number of nozzles of the second nozzle system 160 can depend upon the indentation pattern desired. According to a variation, the first nozzle system 150 comprises at least three nozzles for delivering localized precise compressed air. According to a variation, the indentation pattern (e.g., indentation pattern 165) is placed near the corner of the glass panel such that it is not readily identifiable by an end user but readily apparent to a trained technician or engineer having knowledge of the indentation patterns contemplated hereunder.

A controller 170 (shown in phantom) may be used to control either or both of the first nozzle system 150 and the second nozzle system 160. The controller 170 can determine, as non-limiting examples, whether to operate the nozzles of the first nozzle system 150 or the second nozzle system 160, at what PSI the nozzles should operate, and for what duration the nozzles should operate. In a response from the controller, the nozzles will perform accordingly. The controller 170 may be preprogrammed or used in connection with a graphical user interface. According to yet further variations, the controller 170 can control the position of the nozzles of the first nozzle system 150 and/or the nozzles of the second nozzle system 160, such as by repositioning mechanical arms having the nozzles attached thereto. According to yet further variations, the controller 170 can control a rotatable member that acts to rotate the positioning of the glass panel 162, thereby allowing the controller 170 to position the glass panel 162 in an appropriate arrangement with the nozzles of the first nozzle system 150 and/or the nozzles of the second nozzle system 160.

Figure 4:
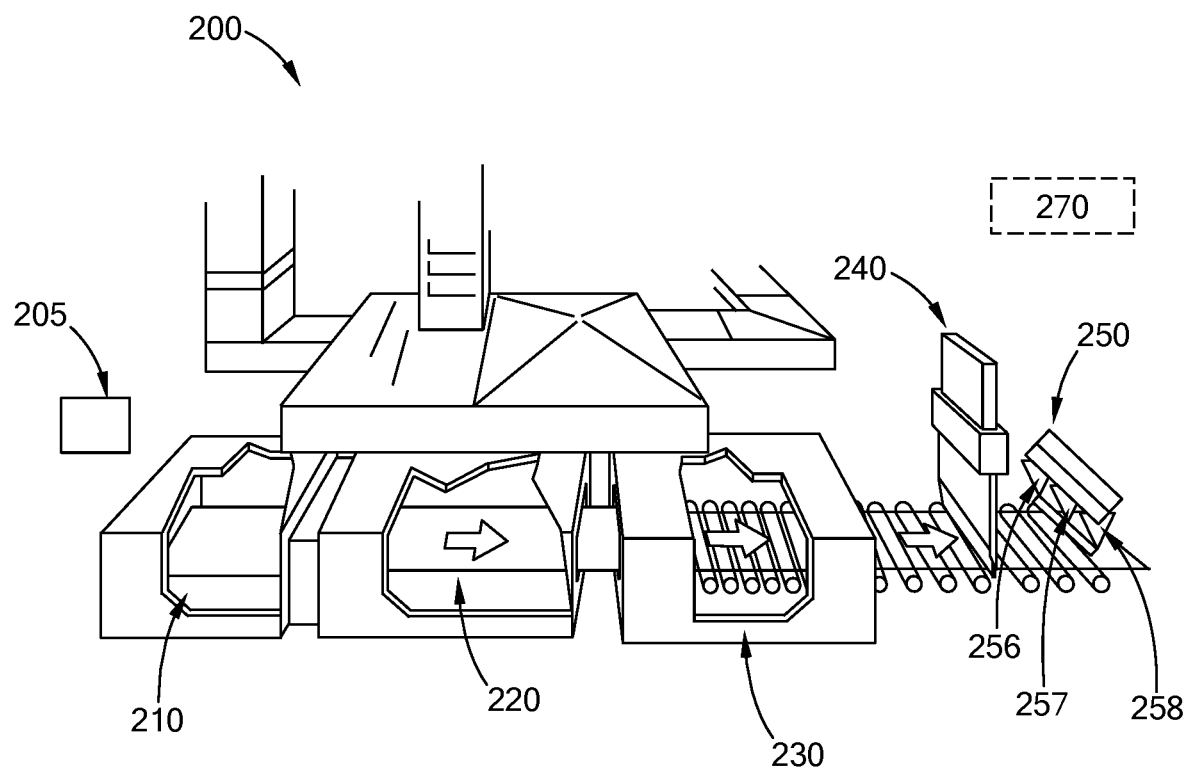
FIG. 4 is a diagrammatic view of a glass panel forming system according to a variation of the present disclosure.

Referring to FIG. 4, a glass panel forming system 200 includes a mixing apparatus 205 (shown schematically) for weighing and mixing glass and, optionally, additives. The composition of glass particles and any optional additives can be predetermined depending on the properties desired in a resultant glass panel.

After sufficient mixing, the glass mixture is introduced into oven 210. The oven 210 is heated to a temperature sufficient to melt the glass mixture into molten glass and may be in the shape of a tank having a stirrer to ensure the glass mixture remains homogenous.

A portion of the molten glass travels from the oven 210 to form a thin layer of molten glass over float chamber 220. The float chamber 220 may comprise molten tin, continuous air blowers, or ceramic rollers, or other devices that function to create a desirable thin glass profile. By way of example, when the float chamber 220 comprises a molten tin bath, the thin layer of molten glass floats over the molten tin bath. The thickness of the molten glass can depend on the characteristics desired in the formed glass panel.

The thin layer of molten glass floats over the float chamber 220 and the temperature of the thin layer of molten glass decreases as its distance relative to the oven 210 increases. Thus, as the thin layer of molten glass exits the float chamber 220, the thin layer of molten glass may be in a semi-hard yet moldable state. The thin layer of molten glass proceeds into lehr 230, where the glass is annealed as desired.

The annealed glass continues to travel through the lehr 230 towards cutters 240, where annealed glass is cut into glass panels having a desired length and width. The glass panels are kept at a temperature sufficient to maintain their moldability. The glass panels are then transferred along rollers, air blowers, or the like.

Figure 5A:
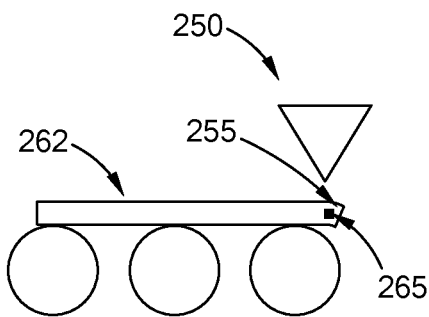
FIG. 5A is an enlarged schematic front view of the nozzle system shown in FIG. 4.

After annealing and cutting, the temperature of the glass panel is maintained at or heated to a temperature such that the glass panel is moldable, and the glass panel and nozzle system 250 are located relative with one another such that compressed air directed from the nozzle system 250 bends a top bend radius 255 into a glass panel 262, as shown in FIG. 5A. By way of example, compressed air is directed from the nozzle system 250 for greater than or equal to about 5 milliseconds to less than or equal to about 7 milliseconds, which forms on a top edge of the glass panel a curvature radius of greater than or equal to about 1.5 millimeters to less than or equal to about 3 millimeters. The PSI from each nozzle of the nozzle system 250 can be calculated such that a precise and equal bend is achieved with every glass panel. The number of nozzles of the nozzle system 250 can depend upon the size of the glass panel, the properties of the glass panel, the radius of the glass panel desired, and the like. According to a variation, the nozzle system 250 comprises at least three nozzles 256, 257, and 258, for delivering localized precise compressed air.

After the top bend radius 255 is formed on the glass panel 262, the nozzle system 250 and the glass panel 262 are located relative with one another, to the extent necessary, such that compressed air directed from the nozzle system 250 forms an indentation pattern 265 on the glass panel 262 at a desired location, such as near the curvature previously developed by the nozzle system 250. Compressed air directed from the nozzle system 250 at this stage is blasted at a pressure higher than previously blasted. The indentation pattern 265 formed by compressed air directed from the nozzle system 250 mark the glass panel 262, and those markings can be used to identify characteristics of the glass panel 262, such as whether the glass panel 262 was tempered, the tint level of the glass panel, whether the glass panel 262 was laminated, the amount of radius of the top bend radius 255 formed by the nozzle system 250, for which application the glass panel was designed for, and the like.

Figure 5B:
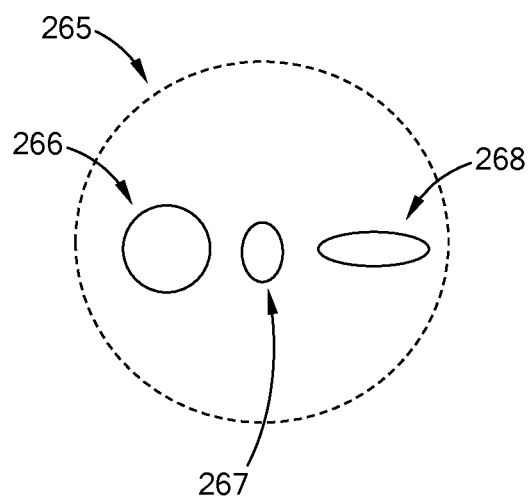
FIG. 5B is an enlarged schematic front view of the identification pattern shown in FIG. 5A.

According to a variation, the nozzle system 250 forms a plurality of indentations that can be used to identify characteristics of the glass. Referring to FIG. 5B, according to a variation, a first indentation 266 may be sized differently than subsequent indentations (e.g., second indentation 267) following the first indentation 266 to identify a start location, and a final indentation 268 may be sized differently than indentations preceding the final indentation 268 to identify an end location. In this manner, the indentation pattern 265 can form identifications markings, such as a binary code pattern, where a dot present between the start location and end location can represent a 1 and an absence of a dot between the start location and end location can represent a 0. With such a pattern, a binary code pattern of three possible indentations (e.g., the first indentation 166, the second indentation 167, and the final indentation 168) placed between a start location and an end location can provide an 8-combination marking system, where each combination represents a marking for identifying the characteristics of the glass panel. According to yet another variation, the start location could be one of the three possible indentations. According to yet another variation, the end location could be one of the three possible indentations. According to yet another variations, the start location could be one of the three possible indentations, and the end location could be one of the other three possible indentations. Rounded indentations should be used to avoid creating stress points in the glass panels. The PSI from each nozzle of the nozzle system 250 can be calculated such that a predetermined, desirable indentation pattern is achieved with every glass panel. By way of not limiting example, the PSI may be less than or equal to about 5 PSI, and in some aspects, less than or equal to about 2 PSI. The number of nozzles of the nozzle system 250 can depend upon the indentation pattern desired. According to a variation, the nozzle system 250 comprises at least three nozzles for delivering localized precise compressed air. Not every nozzle that is active to form the curvature of the glass panel may be active to form the indentation patterns, or vice versa. According to a variation, the indentation pattern 265 (e.g., indentation pattern 265 is placed near the corner of the glass panel such that it is not readily identifiable by an end user but readily apparent to a trained technician or engineer having knowledge of the indentation patterns contemplated hereunder.

A controller 270 (shown in phantom) may be used to control nozzle system 250. The controller 270 can determine, as non-limiting examples, which nozzles to operate of nozzle system 250, at what PSI the nozzles should operate, and for what duration the nozzles should operate. In a response from the controller 270, the nozzles will perform accordingly. The controller 270 may be preprogrammed or used in connection with a graphical user interface. According to yet further variations, the controller 270 can control the position of the nozzles of nozzle system 250, such as by repositioning mechanical arms having the nozzles attached thereto. According to yet further variations, the controller 270 can control a rotatable member that acts to rotate the positioning of the glass panel, thereby allowing the controller 270 to position the glass panel in an appropriate arrangement with the nozzles of nozzle system 250.

Figure 6:
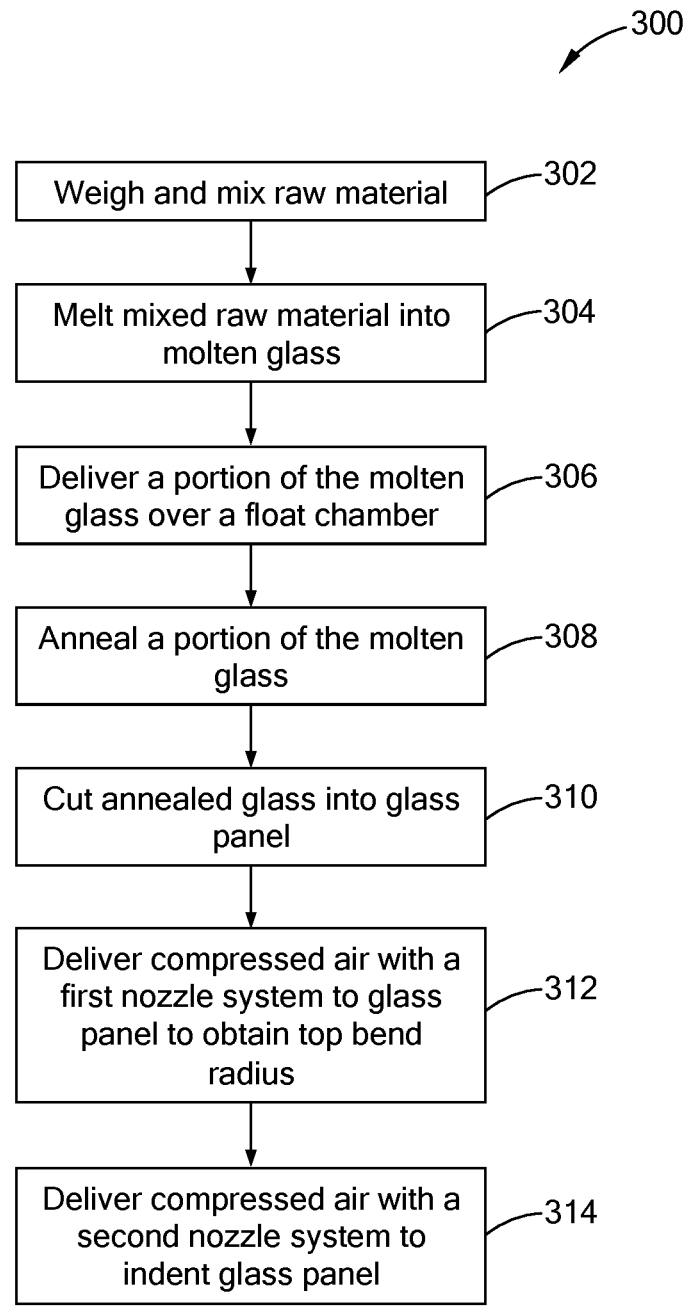
FIG. 6 is a flowchart of a process for preparing a glass panel according to the present disclosure.

Referring to FIG. 6, a flowchart of a routine 300 for preparing a glass panel according to the present disclosure is provided. At 302, raw material is weighed and mixed. The raw material includes glass and optionally includes additives, which can depend on the properties desired in a resultant glass panel. After sufficient mixing, at 304, the glass mixture is introduced into an oven, which is heated to a temperature sufficient to melt the glass mixture into molten glass. The oven may have a stirrer to ensure the glass mixture remains homogenous. At 306, a portion of the molten glass travels from the oven to form a thin layer of molten glass over a float chamber. At 308, the thin layer of molten glass passes into a lehr, where the glass is annealed as desired. At 310, the annealed glass is cut by cutters to form a glass panel. At 312, a first nozzle system distributes localized compressed air over a portion of the glass panel to provide a top bend radius into the glass panel. At 314, a second nozzle system distributes localized compressed air at a pressure higher than the air distributed by the first nozzle system to form small indentations in the glass panel.

Figure 7:
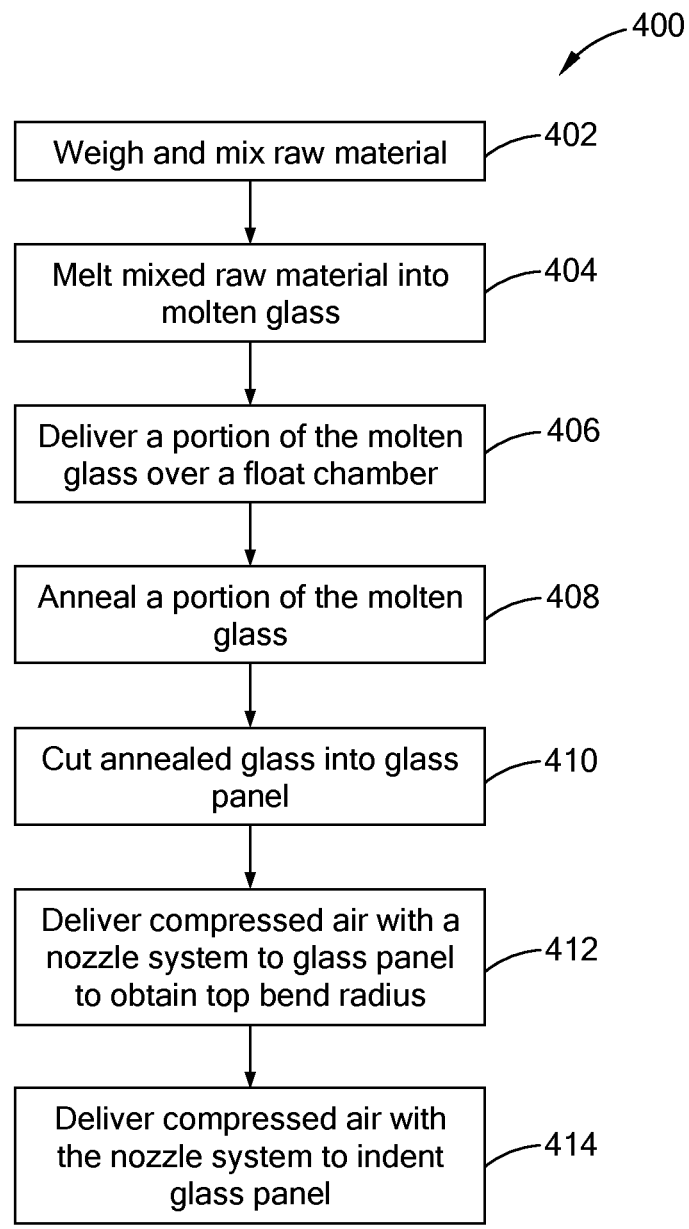
FIG. 7 is a flowchart of process for preparing a glass panel according to a variation of the present disclosure.

Referring to FIG. 7, a flowchart of a routine 400 for preparing a glass panel according to the present disclosure is provided. At 402, raw material is weighed and mixed. The raw material includes glass and optionally includes additives, which can depend on the properties desired in a resultant glass panel. After sufficient mixing, at 404, the glass mixture is introduced into an oven, which is heated to a temperature sufficient to melt the glass mixture into molten glass. The oven may have a stirrer to ensure the glass mixture remains homogenous. At 406, a portion of the molten glass travels from the oven to form a thin layer of molten glass over a float chamber. At 408, the thin layer of molten glass passes into a lehr, where the glass is annealed as desired. At 410, the annealed glass is cut by cutters to form a glass panel. At 412, a nozzle system distributes localized compressed air over a portion of the glass panel to provide a top bend radius into the glass panel. At 414, the nozzle system distributes localized compressed air at a pressure higher than the air previously distributed by the nozzle system to form small indentations in the glass panel.

According to the systems and processes disclosed above, it is believed glass panels can be much more quickly and accurately formed, and that greater than or equal to about 750 glass panels can be formed per hour according to the present disclosure.

While the examples above have been directed to automobile passenger and driver side windows, it is contemplated that the methods and systems disclosed herein extend to the formulation of any glass panels where having identification marking and/or sealing is desirable, including sun roofs, moon roofs, windshields, and back windows.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming a curved portion of a glass panel, the method comprising:
   heating the temperature of the glass panel to a temperature such that the glass panel is moldable;
   applying sequential bursts of compressed air at a first pressure to provide a specified bend radius to the curved portion as the glass panel is being conveyed through a lehr; and
   subsequently applying compressed air at a second pressure that is higher than the first pressure to indent and form identification markings in the glass panel, wherein during subsequently applying compressed air at a second pressure that is higher than the first pressure, the temperature of the glass panel is heated to or maintained at a temperature such that the glass panel is moldable.

2. The method of claim 1, further comprising, prior to applying sequential bursts of compressed air, mixing raw materials comprising glass particles, melting the mixed raw materials to form molten glass, floating the molten glass over a float chamber, annealing the molten glass in a lehr, and cutting the annealed glass into a glass panel.

3. The method of claim 1, wherein the applying compressed air at the second pressure marks a dot matrix onto the glass panel.

4. The method of claim 3, wherein the dot matrix comprises an eight-combination marking system.

5. The method of claim 3, wherein the dot matrix comprises readable binary code.

6. The method of claim 1, wherein the applying compressed air at a first pressure is accomplished with a first nozzle system and applying compressed air at a second pressure is accomplished with a second nozzle system.

7. The method of claim 1, wherein the method includes forming greater than or equal to about 750 glass panels per hour.

8. A method of forming a curved portion of a glass panel, the method comprising:
   heating the temperature of the glass panel to a temperature such that the glass panel is moldable;
   applying sequential bursts of compressed air at a first pressure to bend the curved portion to a specified bend radius as the glass panel is being conveyed through a lehr;
   arranging the curved portion of the glass panel with at least a nozzle directing compressed air at a second pressure that is higher than the first pressure to the glass panel; and
   applying compressed air at the second pressure to form identification markings in the glass panel, wherein during applying compressed air at the second pressure, the temperature of the glass panel is heated to or maintained at a temperature such that the glass panel is moldable.

9. The method of claim 8, wherein the applying compressed air at a second pressure marks a dot matrix onto the glass panel.

10. The method of claim 9, wherein the dot matrix comprises an eight-combination marking system.

11. The method of claim 9, wherein the dot matrix comprises readable binary code.

12. The method of claim 8, wherein the applying compressed air at a first pressure is accomplished with a first nozzle system and applying compressed air at a second pressure is accomplished with a second nozzle system.

13. The method of claim 8, wherein the method includes forming greater than or equal to about 750 glass panels per hour.

14. The method of claim 8, further comprising, prior to applying sequential bursts of compressed air, mixing raw materials comprising glass particles, melting the mixed raw materials to form molten glass, floating the molten glass over a float chamber, annealing the molten glass in the lehr, and cutting the annealed glass into the glass panel.

\* \* \* \* \*